(12) United States Patent
Matsui

(10) Patent No.: US 8,877,383 B2
(45) Date of Patent: Nov. 4, 2014

(54) MAGNESIUM-BASED BATTERY

(75) Inventor: Masaki Matsui, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 308 days.

(21) Appl. No.: 12/819,325

(22) Filed: Jun. 21, 2010

(65) Prior Publication Data

US 2011/0311880 A1  Dec. 22, 2011

(51) Int. Cl.
*H01M 4/48* (2010.01)
*H01M 4/46* (2006.01)
*H01M 10/054* (2010.01)

(52) U.S. Cl.
CPC ............... *H01M 4/48* (2013.01); *H01M 4/466* (2013.01); *H01M 10/054* (2013.01); *Y02E 60/12* (2013.01)
USPC ..................................... 429/231.6; 429/218.1

(58) Field of Classification Search
None
See application file for complete search history.

(56) References Cited

U.S. PATENT DOCUMENTS

| | | | |
|---|---|---|---|
| 5,480,744 A * | 1/1996 | Bai | 429/223 |
| 6,316,141 B1 | 11/2001 | Aurbach et al. | |
| 6,403,255 B1 | 6/2002 | Gofer et al. | |
| 6,713,212 B2 | 3/2004 | Aurbach et al. | |
| 7,011,908 B1 * | 3/2006 | Atwater et al. | 429/224 |
| 7,594,938 B2 * | 9/2009 | Miyamoto et al. | 29/623.2 |
| 2005/0058903 A1 * | 3/2005 | Eylem et al. | 429/220 |
| 2007/0054170 A1 * | 3/2007 | Isenberg | 429/33 |
| 2007/0122701 A1 * | 5/2007 | Yamaguchi | 429/218.1 |
| 2007/0172737 A1 | 7/2007 | Oki et al. | |
| 2008/0160407 A1 | 7/2008 | Ishii et al. | |
| 2008/0182176 A1 | 7/2008 | Aurbach et al. | |
| 2009/0324997 A1 | 12/2009 | Tsuji | |
| 2010/0012886 A1 | 1/2010 | Ryu et al. | |

FOREIGN PATENT DOCUMENTS

| | | | | |
|---|---|---|---|---|
| EP | 2169755 A1 | 3/2010 | | |
| JP | 2001076720 A | 3/2001 | | |
| JP | 2001076721 A | 3/2001 | | |
| JP | 2002025555 A | 1/2002 | | |
| JP | 2002100344 A | 4/2002 | | |
| JP | 2009-064730 | * | 3/2009 | ............ H01M 10/36 |
| WO | WO-0109972 A1 | 2/2001 | | |

* cited by examiner

*Primary Examiner* — Ula C Ruddock
*Assistant Examiner* — Tony Chuo
(74) *Attorney, Agent, or Firm* — Gifford, Krass, Sprinkle, Anderson & Citkowski, P.C.

(57) ABSTRACT

An electrochemical device, such as a magnesium-ion battery, comprises a first electrode including a first active material, a second electrode, and an electrolyte located between the first electrode and the second electrode. The electrolyte may include a magnesium compound, such as a magnesium salt. In representative examples, an improved active material includes a group 15 chalcogenide, in particular a bismuth chalcogenide, such as bismuth oxide or other chalcogenide. In various examples, the improved active material may be used in a positive or negative electrode of an example battery.

5 Claims, 3 Drawing Sheets

MAGNESIUM-BASED BATTERY

FIELD OF THE INVENTION

The invention relates to electrochemical devices such as batteries, in particular rechargeable batteries, such as a rechargeable magnesium-ion battery.

BACKGROUND OF THE INVENTION

Rechargeable batteries, such as lithium-ion batteries, have numerous commercial applications. Energy density is an important characteristic, and higher energy densities are desirable for a variety of applications.

A magnesium ion in a magnesium-ion battery carries two electrical charges, in contrast to the single charge of a lithium ion. Improved electrode materials would be very useful in order to develop high energy density batteries.

SUMMARY OF THE INVENTION

Examples of the present invention include magnesium-based batteries having an electrode including an active material, the active material comprising a group 15 element such as bismuth (Bi). In some examples, the active material includes a chalcogenide of a group 15 element, such as an oxide, sulfide, selenide, or telluride of a group 15 element, such as phosphorus, arsenic, antimony, or bismuth. A particular example is an active material including bismuth oxide. For example, bismuth oxide may be present as particles, such as micron-scale, sub-micron, or nanoscale $Bi_2O_3$ particles. Examples include rechargeable magnesium-ion batteries.

Examples of the present invention include improved active materials for electrochemical devices, such as rechargeable magnesium-ion batteries. A novel active material may be used in the positive electrode or the negative electrode of a battery.

In some representative examples, the negative electrode may be magnesium metal and the positive electrode may comprise an active material including a compound of bismuth and/or another group 15 element. The positive electrode may comprise bismuth oxide. The positive electrode may further include an electron conductive material and/or a binder.

In further representative examples, the positive electrode material may be any conventional active material and the negative electrode may comprise a novel active material according to an embodiment of the present invention, such as a group 15 compound. For example, the negative electrode may comprise bismuth oxide, and may further include an electron conductive material and/or a binder.

Example batteries may include a negative electrode, positive electrode, and an electrolyte layer. The electrolyte layer may be provided by a separator soaked in an electrolyte solution. The electrolyte solution includes magnesium ions, or other active ion according to the type of battery. For example, the electrolyte may comprise a non-aqueous liquid and a magnesium salt.

An improved active material may further include an electrically conducting material such as carbon, and a binder material, such as a polymer binder.

An example magnesium-based battery comprises a first electrode, including an active material, a second electrode, and an electrolyte located between the first electrode and the second electrode, the electrolyte including a magnesium salt, the active material including a group 15 compound, for example a group 15 chalcogenide such as a bismuth compound, in particular bismuth oxide. In various examples, the first electrode may be either the positive electrode or negative electrode of the battery.

An example magnesium-ion battery comprises a positive electrode, including an active material, a negative electrode including a magnesium-containing metal such as metallic magnesium or a magnesium alloy, and an electrolyte including a magnesium salt located between the first electrode and the second electrode. The active material includes a group 15 compound, for example a group 15 chalcogenide such as a bismuth compound, for example bismuth oxide.

Another example magnesium-ion battery comprises a positive electrode, including a first active material, a negative electrode, including a second active material, an electrolyte located between the first electrode and the second electrode, the electrolyte including a magnesium salt. The active material includes a group 15 compound, for example a group 15 chalcogenide such as a bismuth compound, in particular bismuth oxide. The second active material may comprise any material capable of electrolytically interacting with the magnesium ions of the electrolyte. Electrodes may include including a binder and an electrically conducting material in addition to the active material, and may be supported on a current collector.

DETAILED DESCRIPTION OF THE INVENTION

Examples of the present invention include electrochemical devices, such as batteries, in particular rechargeable batteries. Examples include magnesium-based batteries, and specifically to materials used as active materials within the electrodes of a magnesium-ion battery. In particular, an example battery includes an electrode active material comprising at least one group 15 element. For example, the active material may include a chalcogenide of a group 15 element. The improved active materials described herein may be used within the cathode and/or anode of an example battery.

In a specific example, which is not intended to be limiting, an improved active material for a magnesium-ion battery includes bismuth oxide.

A rechargeable magnesium-ion battery is expected to be a high energy battery system, because of its high capacity density. In particular, as compared to lithium-ion batteries, the magnesium ion transfers two electrons per magnesium ion. However, previously there have previously been no good cathode or anode active materials which can fully utilize the advantage of the high capacity density.

In examples of the present invention, improved active materials including a group 15 element are used as the active material for a rechargeable battery. Example electrodes include an active material including a compound, such as a chalcogenide, of at least one element from the group of elements consisting of bismuth, antimony, arsenic, or phosphorus. Representative examples are chalcogenides of bismuth, antimony, and arsenic, or some combination thereof. A preferred active material includes bismuth, such as a bismuth compound, such as a bismuth chalcogenide. Specific examples of novel active materials include chalcogenides of group 15 elements, such as oxides, sulfides, and selenides thereof. A chalcogenide may include one or more group 16 elements, such as one or more of oxygen, sulfur, selenium, and tellurium.

A particular example of an improved active material comprises bismuth oxide. For example bismuth (III) oxide, $Bi_2O_3$, may be used in an improved active material. Other examples include bismuth sulfide, bismuth selenide, antimony oxide, antimony sulfide, antimony selenide, arsenic oxide, arsenic sulfide, antimony selenide, mixed chalcogenides such as selenide sulfides of one or more group 15 elements, and the like.

The active material may further comprise an electrically conductive material and a binder. Example electrically conducting materials include carbon particles, such as carbon black. Example binders include polymers.

Figure 1:
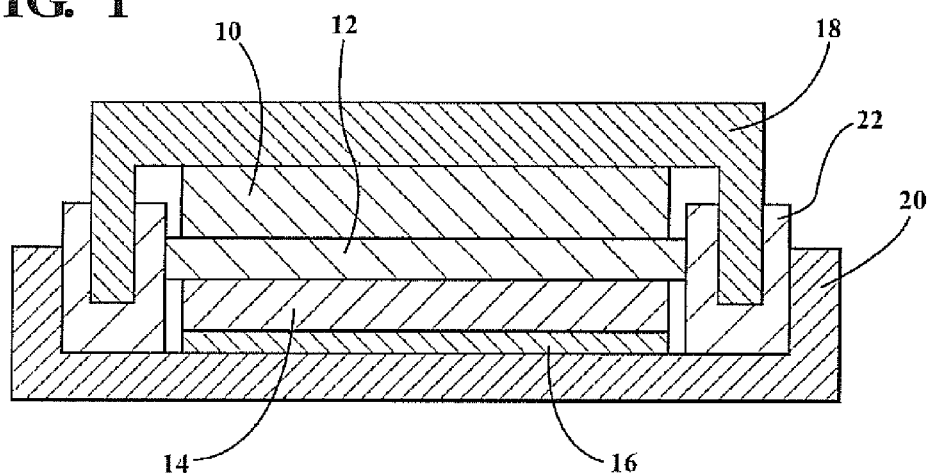
FIG. 1 shows a magnesium-ion battery comprising a magnesium metal negative electrode and a positive electrode including a novel active material.

FIG. 1 shows a rechargeable magnesium-ion battery having an improved positive electrode active material. The battery comprises a negative electrode 10 comprising magnesium metal, an electrolyte layer 12, a positive electrode 14, current collector 16, negative electrode housing 18, positive electrode housing 20, and sealing gasket 22. The electrolyte layer 12 comprises a separator soaked in electrolyte solution, and the positive electrode 14 is supported by the current collector 16. In this example, the positive electrode includes an improved active material according to an example of the present invention, conductive carbon, and a binder. For example, the positive electrode may include bismuth oxide, other group 15 chalcogenide, or other group 15 compound.

Figure 2:
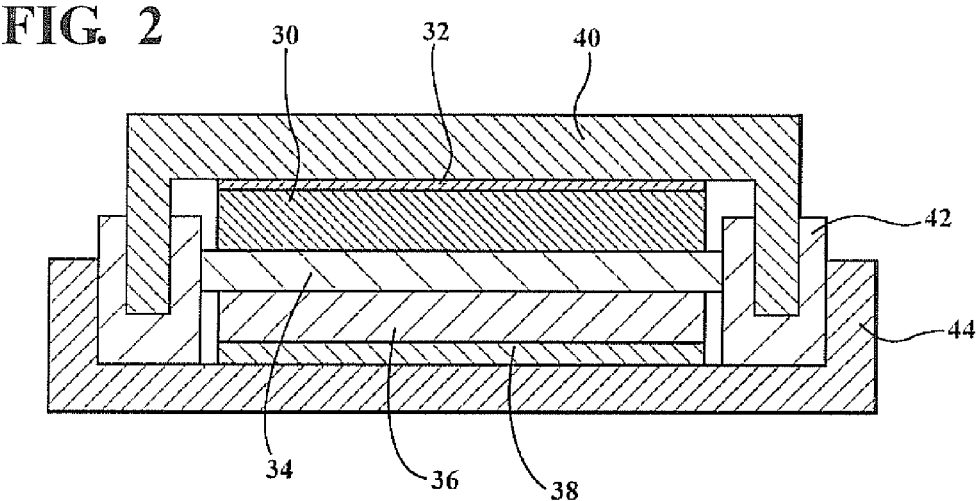
FIG. 2 shows a magnesium-ion battery having a novel active material within the negative electrode.

FIG. 2 shows another example in which a novel active material is used in the negative electrode of a rechargeable magnesium battery. The battery comprises negative electrode 30, current collector 32, electrolyte layer 34, positive electrode 36, current collector 38, negative electrode housing 40, gasket 42, and positive electrode housing 44. The electrolyte layer 34 comprises a separator soaked in electrolyte solution, and the positive and negative electrodes are supported by respective current collectors. In this example the negative electrode includes an improved active material according to an example of the present invention, conductive carbon, and a binder. For example, the negative electrode may include bismuth oxide, other group 15 chalcogenide, or other group 15 compound. The positive electrode may include any conventional active material used in the positive electrodes of such rechargeable batteries, such as another oxide, and may further comprise conductive carbon and a binder. In a rechargeable battery, magnesium ions transfer between the first and second active materials during charge/discharge cycles.

Figure 3A:
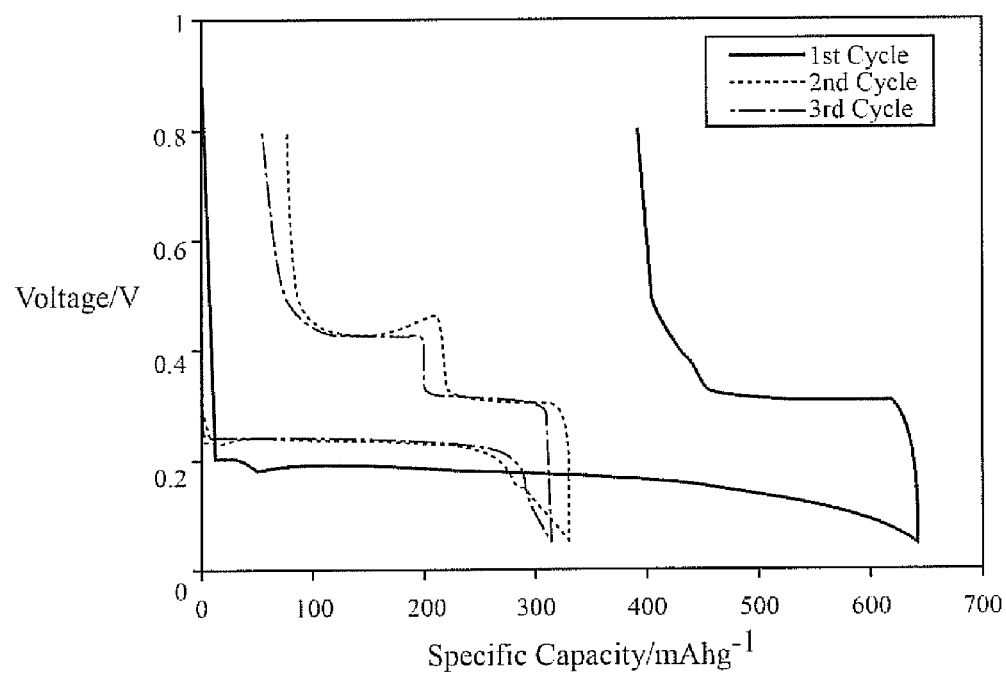
FIGS. 3A-3C show charge-discharge curves for a magnesium/bismuth oxide half cell for three cycles, as a function of particle size.
Figure 3B:
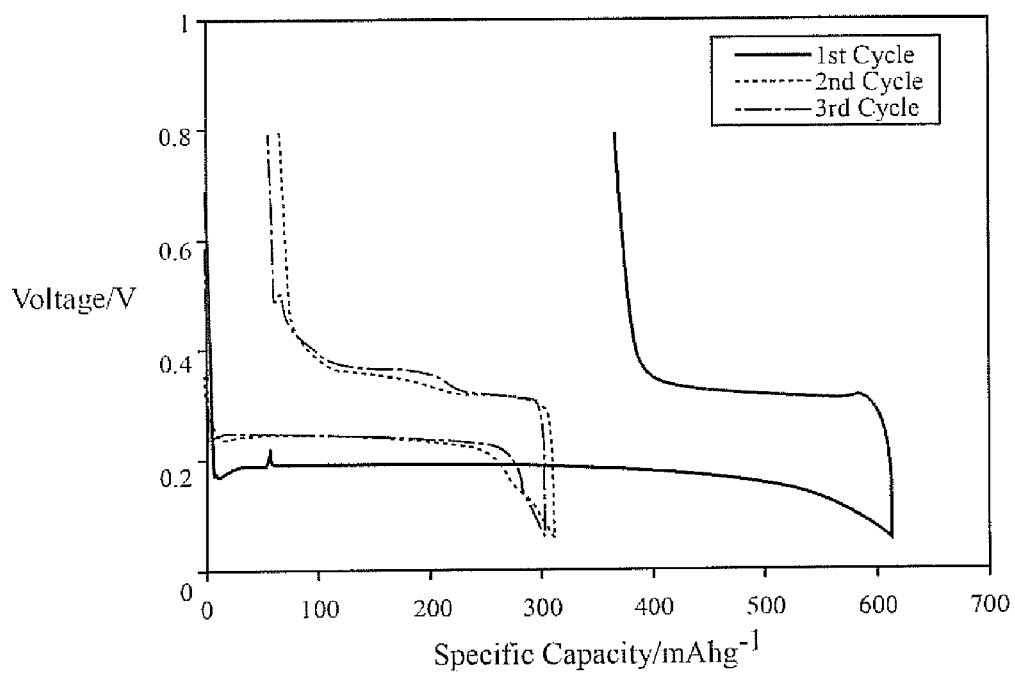
Figure 3C:
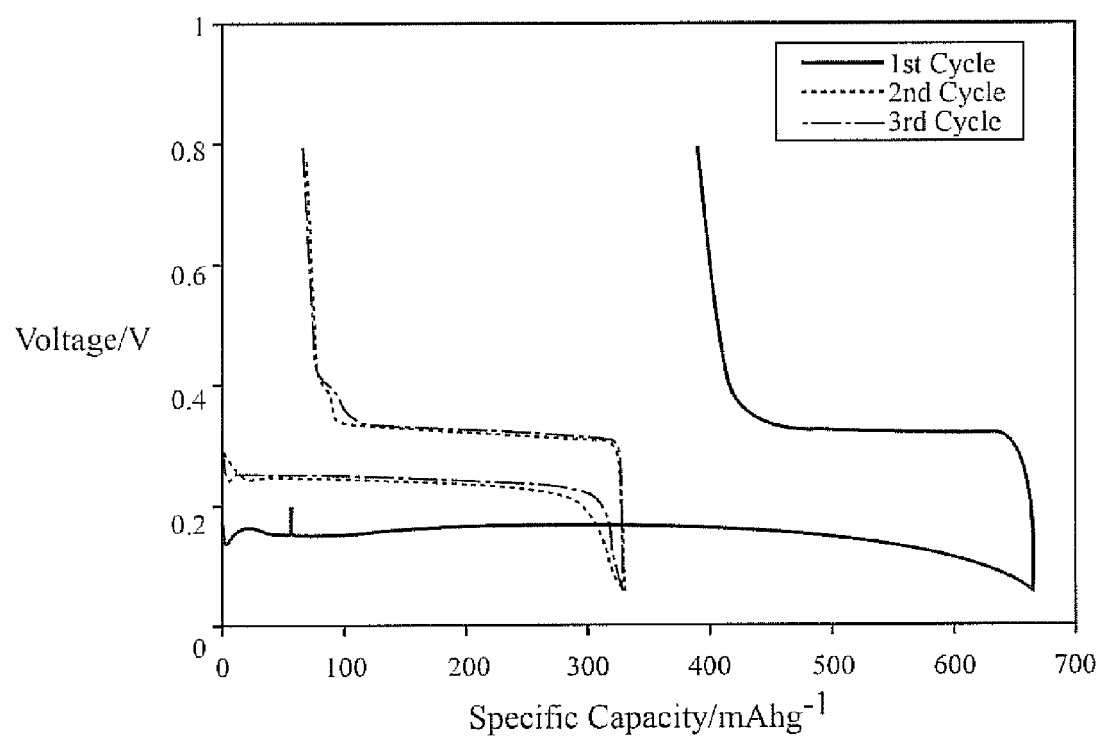

FIGS. 3A-3C show a comparison of the charge/discharge curves for three bismuth oxide electrodes. Overall, the electrode configurations showed an energy density of more than 300 milliamp-hours/gram consistently after the second cycle.

FIG. 3A shows charge/discharge curves for nanoscale bismuth oxide particles, with an average particle diameter of 20 nanometers. FIG. 3B shows curves for submicron scale bismuth oxide particles having an average diameter of 100 nanometers. FIG. 3C shows curves for micro scale bismuth oxide particles having an average diameter of 10 microns.

The figures show the curves for a magnesium/bismuth oxide half cell during the initial three cycles. During the first cycle of the nanoscaled material (FIG. 3A), the nanoscaled-$Bi_2O_3$ particle based electrode configuration had 641 mAh/g of discharge capacity, but only about 40% of the capacity was reversible. For the second and third cycles, the Coulombic efficiency improved gradually to approximately 80%, and a continuously stable discharge capacity higher than 300 mAh/g was obtained in further cycles. In the case of bismuth oxide, a capacity of 300 mAh/g corresponds to 2,670 milliamp-hours per cubic centimeter ($mAh/cm^3$), compared with a figure for lithium metal of 2,061 $mAh/cm^3$. Hence, the magnesium/bismuth oxide system has significant potential advantages in terms of volumetric capacity density over lithium-ion batteries.

The results shown in FIGS. 3A-3C illustrate that improved properties are obtained over a wide range of particle size. This is the first time that an energy density of greater than 300 milliamp-hours/gram (mAh/g or $mAhg^{-1}$) has been obtained for a rechargeable magnesium battery.

Hence, an improved active material comprises a group 15 element, such as bismuth, which may be in the form of a chalcogenide such as an oxide, sulfide, selenide, or telluride. The improved active material may be used in the positive or negative electrode of an electrochemical device, such as a rechargeable battery. The active material may include one or more group 15 elements, such as an oxide, sulfide, selenide, or telluride (or combination thereof) of one or more group 15 elements.

An example rechargeable battery comprises an electrolyte layer, such as a non-aqueous electrolyte layer including magnesium ions. Many examples discussed herein relate to magnesium-ion batteries. However, other examples include other alkaline earth metal ion based batteries, such as calcium-ion based batteries. Examples may also include aluminum-ion based batteries. For example, the battery of FIG. 1 may comprise a negative electrode including calcium metal or aluminum metal, respectively, with the electrolyte including the appropriate electrolytically active ionic species. In some examples, a battery may function using a plurality of electrolytically active ionic species. Other example rechargeable ion batteries which may use improved active materials according to the present invention include beryllium ion, strontium ion, and barium ion based batteries.

The electrolyte layer may include a separator which helps maintain electrical isolation between the positive and negative electrodes. A separator may comprise fibers, particles, web, porous sheet, or other form of material configured to reduce the risk of physical contact and/or short circuit between the electrodes. The separator may be a unitary element, or may comprise a plurality of discrete spacer elements such as particles or fibers. The electrolyte layer may comprise a separator infused with an electrolyte solution. In some examples, for example using a polymer electrolyte, the separator may be omitted.

The electrolyte layer may include a non-aqueous solvent, such as an organic solvent, and a salt of the active ion, for example a magnesium salt. Magnesium ions provided by the magnesium salt interact electrolytically with the active material(s). An electrolyte may be an electrolyte including or otherwise providing magnesium ions, such as a non-aqueous or aprotic electrolyte including a magnesium salt. The electrolyte may include an organic solvent. Magnesium ions may be present as a salt or complex of magnesium, or as any appropriate form.

An electrolyte may include other compounds, for example additives to enhance ionic conductivity, and may in some examples include acidic or basic compounds as additives. An electrolyte may be a liquid, gel, or solid. An electrolyte may be a polymer electrolyte, for example comprising a plasticized polymer, and may comprise a polymer infused with or otherwise including magnesium ions. In some examples, an electrolyte may comprise a molten salt.

In the example of a battery comprising a negative electrode including magnesium metal, magnesium may be present as a sheet, ribbon, particles, or other physical form. Magnesium may be present as substantially pure magnesium metal, or in some other form. For example, a negative electrode may comprise a magnesium-containing metal, such as a magnesium alloy. A magnesium-containing electrode may be supported by a current collector.

A current collector may comprise a metal or other electrically conducting sheet on which the electrode is supported. A metal sheet may comprise aluminum, copper, or other metal or alloy. In some examples, a metal housing may provide the function of a current collector. Other conducting materials, such as electrically conducting polymers, may be used as the current collector.

A binder used in an electrode may comprise any material capable of binding the electrode components. Many binders are known in the battery arts, for example various polymer binders are known and can be used.

The active material may be particulate, for example having an average (mean or median) diameter (or other analogous cross-sectional diameter) in the range 1 nm-100 microns, more particularly in the range 1 nm-20 microns, such as 10 nm-10 microns. In some examples, the particles are nanoscale, for example having an average (mean or median) diameter (or other analogous cross-sectional diameter) in the range 1 nm-1 micron, such as 1 nm-100 nm. However, the invention is not limited to any particular average particle size or particle size distribution.

Examples such as those illustrated in FIGS. 1 and 2 may be in the form of button cells. However, the invention is not limited to a particular form of battery. Examples of the present invention include batteries having one or more cells, electrically connected in parallel and/or series, in any appropriate form factor such as button cells, other round cells, cylindrical cells, rectangular or other prismatic cells, and the like. Example apparatus also include rolled-up battery faiths, and combinations of a battery with a supercapacitor and/or fuel cell, and the like.

Examples of the present invention also include various electrically-powered apparatus, such as consumer electronic devices, medical devices, electric or hybrid vehicles, or other apparatus including batteries according to examples of the present invention.

An active material including a group 15 compound (for example a group 15 chalcogenide such as a bismuth compound, in particular bismuth oxide) may include additional elemental components. Examples include mixed oxides of bismuth and rare-earth elements, other transition metals, or other oxides.

Example active materials also include compounds of one or more group 15 elements (e.g. one or more element selected from phosphorus, arsenic, antimony, and bismuth), and one or more chalcogens (e.g. one or more element selected from oxygen, sulfur, selenium, and tellurium). Representative examples include oxides, selenides, sulfides, tellurides, selenide sulfides, selenide tellurides, sulfide tellurides, and the like. Such compounds may include one or more group 15 elements, and may further include one or more other metals. Preferably, active materials are solid materials at operational temperatures.

Examples of the present invention include both primary (non-rechargeable, e.g. magnesium batteries) and secondary (rechargeable, e.g. magnesium ion) batteries. Specific examples include rechargeable magnesium-ion batteries. The term magnesium-based battery includes both primary and secondary batteries, i.e. both magnesium batteries and magnesium-ion batteries. Examples of the present invention include any magnesium-based battery, including rechargeable magnesium-ion batteries having an energy density greater than conventional lithium-ion rechargeable batteries.

Electrodes may be fabricated by any suitable method. For example, a paste may be formed of particles of the active material, a binder, and an electron-conducting material (e.g. graphitic carbon particles or carbon black). The paste may be deposited on an electrically conducting substrate, such as a current collector, and heat treated as necessary.

An improved process of fabricating a battery, such as a rechargeable magnesium-ion battery, comprises providing first and second electrodes separated by an electrolyte, at least one electrode including a group 15 compound, such as a group 15 chalcogenide, for example a bismuth compound such as a bismuth chalcogenide, e.g. bismuth oxide.

The invention is not restricted to the illustrative examples described above. Examples described are not intended to limit the scope of the invention. Changes therein, other combinations of elements, and other uses will occur to those skilled in the art. The scope of the invention is defined by the scope of the claims.

Having described our invention, I claim:

1. An apparatus, the apparatus being a battery comprising:
    an anode, including an active material formed of a group 15 chalcogenide;
    a cathode;
    an electrolyte located between the anode and the cathode, the electrolyte including a magnesium compound,
    the battery being a rechargeable magnesium-ion battery wherein magnesium ions transfer between the anode and cathode during charge and discharge cycles.

2. The apparatus of claim 1, the group 15 chalcogenide being a compound including one or more elements from the group consisting of phosphorus, arsenic, antimony, and bismuth, and further including one or more elements from the group consisting of oxygen, sulfur, selenium, and tellurium.

3. The apparatus of claim 1, the active material including a bismuth chalcogenide.

4. The apparatus of claim 3, the bismuth chalcogenide being a bismuth oxide.

5. The apparatus of claim 1, the rechargeable magnesium-ion battery having an energy density of at least 300 milliamp-hours/gram.

* * * * *